Figure 1:
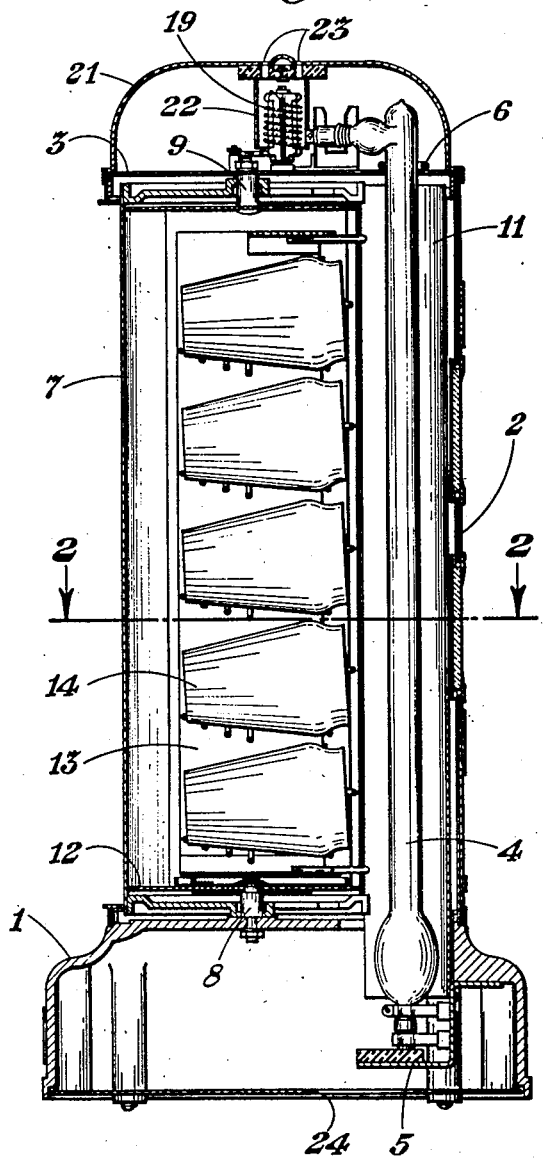

June 29, 1937.  L. J. BUTTOLPH  2,085,573
ULTRAVIOLET STERILIZING APPARATUS
Filed June 13, 1933  3 Sheets-Sheet 1

INVENTOR
Leroy J. Buttolph
BY
ATTORNEY

June 29, 1937. L. J. BUTTOLPH 2,085,573
ULTRAVIOLET STERILIZING APPARATUS
Filed June 13, 1933    3 Sheets-Sheet 2
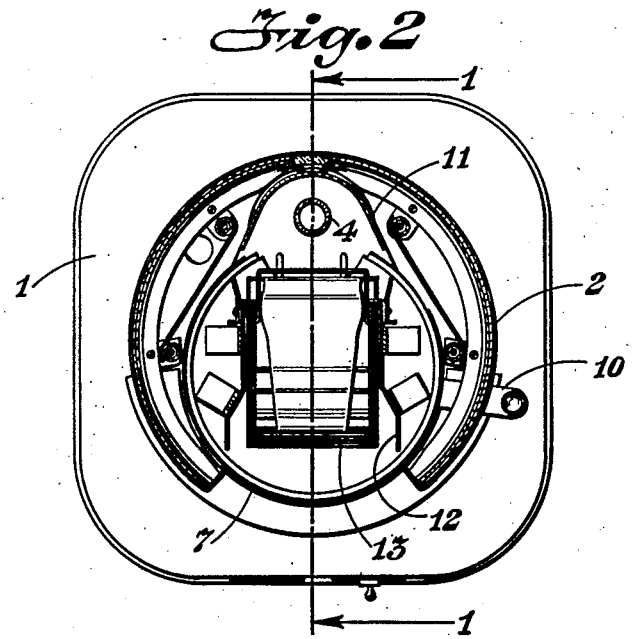
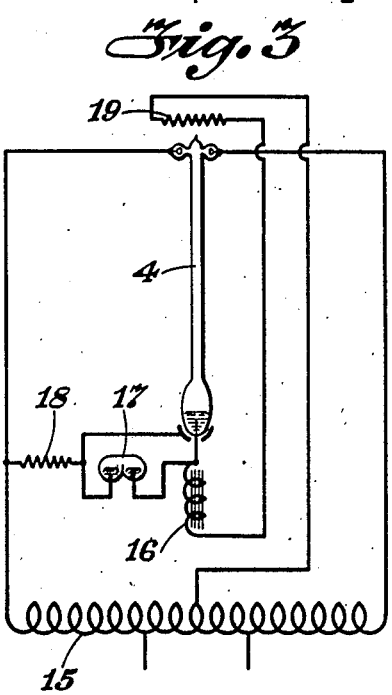
INVENTOR
Leroy J. Buttolph
BY
ATTORNEY June 29, 1937. L. J. BUTTOLPH 2,085,573
ULTRAVIOLET STERILIZING APPARATUS
Filed June 13, 1933 3 Sheets-Sheet 3
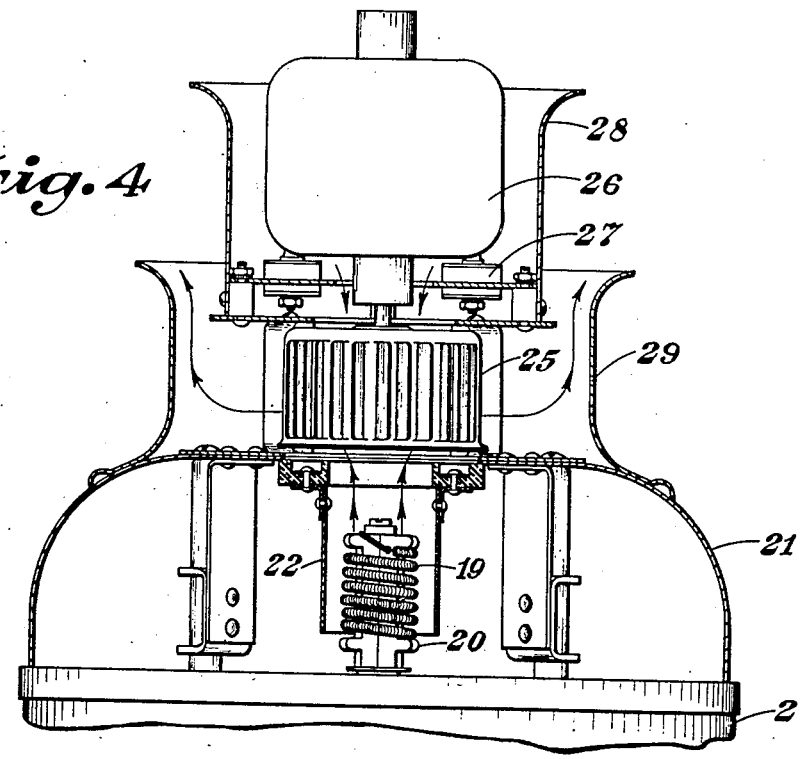
Fig. 4
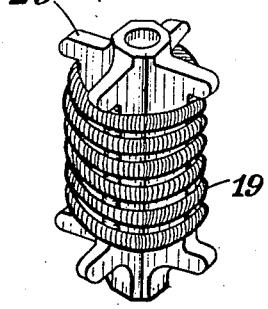
Fig. 6
Fig. 5
INVENTOR
Leroy J. Buttolph
BY
ATTORNEY Patented June 29, 1937

2,085,573

UNITED STATES PATENT OFFICE 2,085,573

ULTRAVIOLET STERILIZING APPARATUS

Leroy J. Buttolph, Grantwood, N. J., assignor to General Electric Vapor Lamp Company, Hoboken, N. J., a corporation of New Jersey Application June 13, 1933, Serial No. 675,618

3 Claims. (Cl. 21—101)

The present invention relates to the art of irradiation generally, and in particular to the decomposition of the ozone formed by ultraviolet irradiations.

A particular object of the invention is to provide a novel means of decomposing any ozone formed during the irradiation of articles with ultraviolet radiation. Another object of the invention is to utilize the energy available in the ballast resistance of the ultraviolet generator to decompose said ozone. Other objects and advantages of the invention will appear from the following detailed specification, or from an inspection of the accompanying drawings.

The invention consists in the new and novel combination of elements hereinafter set forth and claimed.

Ultraviolet generators as ordinarily designed require considerable ventilation in order to operate at high efficiency. The ventilating air is, of course, subjected to the radiations from the generator during its passage thereabout, as a result of which a portion of the oxygen content thereof is converted to ozone. This effect is particularly marked where the generator is a quartz mercury vapor lamp which is operated at a relatively low pressure. In some cases, as where the generator is operated for long intervals in a relatively small room, the resulting ozone concentration may become annoying. Hence it has been found desirable to prevent the escape of ozone from the generator while still providing adequate ventilation therefor. I have now discovered that this ozone may be entirely eliminated, or reduced to any extent desired, by providing a heater in the orifice through which the ventilating air escapes from the housing about the ultraviolet generator. I have furthermore discovered that the ballast resistance which is commonly used in order to stabilize the operation of these ultraviolet generators may be used as the aforesaid heater, whereby my novel result is produced without any appreciable increase in the wattage consumed by the generator.

For the purpose of illustrating my invention I have shown a preferred embodiment, together with a modification thereof, in the accompanying drawings, in which Fig. 1 is a sectional elevation of an apparatus which is especially designed for the sterilization of drinking glasses by ultraviolet radiations, Fig. 2 is a sectional view of this apparatus taken on the line 2—2 of Fig. 1, Fig. 3 is a schematic diagram of the circuit employed in this novel apparatus, Fig. 4 is a fragmentary elevational view, in part section, of a modification of the apparatus shown in Fig. 1, Fig. 5 is a schematic diagram of a modification of the circuit shown in Fig. 3, and Fig. 6 is a perspective view of the air heater employed.

As shown in these drawings, with particular reference to Figs. 1 to 3, my novel apparatus has a base 1 of cast metal upon which there is supported a cylindrical housing 2 of sheet metal or the like. The top of said housing is closed by a sheet metal disc 3. A mercury vapor arc tube 4 of fused silica or other ultraviolet transmitting material extends vertically within said housing 2 near one side thereof. Said tube is supported at its lower end within the base 1 by a bracket 5 which is attached to said base, while the upper end of said arc tube passes through a relatively large opening in the disc 3 and is secured by means of suitable clamps 6 mounted on said disc. A drum 7 whose maximum diameter is nearly equal to the distance between the arc tube 4 and the far side of the housing 2 is mounted on the studs 8 and 9 carried by the base 2 and the disc 3, respectively, in such fashion that it is rotatable between said tube and said housing. An operating lever 10 which is attached to said drum extends through a suitable slot between the housing 2 and the base 1 and serves as means to rotate said drum. Said housing 2 has an opening therein at a point diametrically opposite the arc tube 4, said opening extending from top to bottom of said housing and serving to permit insertion of glasses or the like therein while said drum 7 has a similar opening therein. The edges of a trough shaped reflector 11 which is placed about the arc tube 4 extend to a point in close proximity to the path of the drum 7. The width of the aforesaid openings in the drum 7 and in the housing 2 are so chosen with respect to the distance between the edges of the reflector 11 and the edges of the opening in the latter member that said openings can never register save when the drum 7 cooperates with said reflector 11 to entirely enclose the arc tube 4, so that it is impossible for direct radiations from said tube 4 to escape from the housing 2 at any time. The studs 8 and 9 extend through the ends of said drum 7 and at their inner ends carry a fixed rack 12 which in turn is adapted to retain a removable rack 13 for the glasses 14 or the like. The base 1 is adapted to retain the auxiliary apparatus which is usually associated with the arc tube 4, such as shown in Fig. 3, the autotransformer 15, stabilizing inductance 16, shifter 17, and shifter resistance 18 all being preferably enclosed therein. The ballast resistance 19, which is preferably connected in the cathode lead of the arc tube 4, as shown in Fig. 3, in order to concentrate all of the heating into a single unit, is centrally mounted on the disc 3, as shown in Fig. 1.

Said resistance 19 is preferably formed of helically wound wire which is in turn helically wound upon a refractory spider 20 of low thermal capacity in such fashion that the turns thereof are to a large extent suspended in space, as particularly shown in Fig. 6. The domed cover 21 which rests on the disc 3 has a metal tube 22 affixed to the under side thereof of slightly larger diameter than that of the resistance 19, said tube extending to a point near the bottom of said resistance. A plurality of ventilating openings 23 are provided in the top 21 in registry with the tube 22, while a large opening 24 is provided in the bottom of the base 1 at a point below the arc tube 4 for the free entrance of air.

In the use and operation of the apparatus shown in Figs. 1 to 3, after the arc has been started in the arc tube 4 by operation of the shifter 17 in the usual manner the radiations generated by said arc tube are used to sterilize the glasses 14 which are exposed thereto. These radiations likewise tend to produce an appreciable amount of ozone in the air surrounding said tube. Since this ozonized air is being heated by said tube 4 and by the auxiliary apparatus associated therewith it tends to rise and escape from the housing 2. The only path for the escape of this air, however, is through the openings 23 in the cover 21, and to reach these openings this air has to virtually pass through the turns of the ballast resistance 19, which are heated to a temperature of the order of 400–500° C. by the arc current passing therethrough. The air is thus heated to a considerable temperature, of the order of 150° C., before it emerges from the housing, and at this high temperature any ozone contained therein is rapidly converted back into oxygen, with the result that the air emerging from the openings 23 is ozone free and odorless. The draft created by the heated air rising through the turns of the resistance 19 tends to maintain the desired exhaust of the ozonized air therethrough, even though the drum 7 be in such position that its opening is in registry with the opening in the housing 2. Thus the energy which is ordinarily used only to stabilize the operation of the mercury arc is here used for the two additional purposes of increasing the air circulation and of deozonizing the escaping air. Thus the deozonization is accomplished without any material increase in the energy absorbed by the outfit.

In some cases a more positive ventilation of the housing 2 may be desired. This is readily accomplished, as shown in Fig. 4, by mounting an exhaust fan 25 above the tube 22 with its air intake open to said tube. Said fan is mounted on the shaft of a motor 26 which is in turn supported by suitable brackets extending upwardly from the cover 21, which is preferably reinforced in any suitable manner to carry the weight. In order to eliminate motor noise felt blocks 27 are preferably included in this mounting. A housing 28 of somewhat larger diameter than that of the motor 26 is placed about said motor, and suitable air openings are provided from said housing to the air intake of the fan 25. A somewhat similar housing 29 of larger diameter is preferably placed about the blower 25, in order to conceal said blower, and to direct the exhaust air upwardly.

The operation of the device shown in Fig. 4 is in most respects similar to that previously described in connection with Figs. 1–3. The motor driven exhaust fan 25 materially increases the ventilation of the device, however, and in addition causes a slightly subatmospheric pressure within the housing 2, so that any leakage of air through the loading aperture in said housing is always inward. Thus the escape of ozonized air from said housing is absolutely precluded. In addition to ventilating said housing 2 said exhaust fan likewise draws a current of air downwardly through the motor 26 and through its housing 28, keeping said motor relatively cool. The exhausted air is directed upwardly through the housing 29. Due to the increased air flow over the heater 19 the energy required in said heating coil in order to provide the necessary rise in the temperature of the air to ensure the deozonization thereof is, of course, somewhat greater than is necessary without such forced ventilation.

In some cases, where efficiency is not of paramount importance, the circuit shown in Fig. 5 may be used in either of the devices previously described. In this circuit the mercury vapor arc tube is connected to the autotransformer 15 in the conventional manner, ballast resistances 30 being inserted in each anode lead. The resistance 19' which is used to deozonize the exhaust air is in this case connected directly to said autotransformer. With this circuit the air can be easily deozonized, although the wattage dissipated in the ballast resistances 30 is not used for this purpose. Where space permits, of course, the resistances 30 may be mounted along with the resistance 19' in the tube 22, thus further availing of the ballast energy in the manner previously described.

While I have described my invention by reference to particular embodiments thereof it is to be understood that it is not limited thereto, but that various changes, omissions, and substitutions, within the scope of the appended claims, may be made therein without departing from the spirit of my invention.

I claim as my invention:—

1. In combination, a housing, a source of ultraviolet radiations within said housing, an air inlet and an air outlet for said housing, said housing also having other orifices therein, means to heat the air passing through said outlet to a temperature sufficient to decompose any ozone therein, and means at said outlet to increase the draft.

2. In combination, a housing, a source of ultraviolet radiations within said housing, an air inlet and an air outlet for said housing, said housing also having other orifices therein, a heater in said outlet to decompose ozone formed by radiations from said source, and a fan associated with said outlet to increase the air flow therethrough.

3. In combination, a housing, a source of ultraviolet radiations within said housing, an air inlet and an air outlet for said housing, said housing also having other orifices therein, means to heat the air passing through said outlet to a temperature sufficient to decompose any ozone therein, and means to remove the air from said housing through said outlet at such a rate that the pressure within said housing is slightly less than that of the atmosphere, whereby all leakage of air is inward.

LEROY J. BUTTOLPH.